United States Patent [19]

Carrington

[11] 4,433,819
[45] Feb. 28, 1984

[54] AERODYNAMIC DEVICE

[76] Inventor: Alfred C. Carrington, 33811 Morse St., Mt. Clemens, Mich. 48043

[21] Appl. No.: 345,788

[22] Filed: Feb. 4, 1982

Related U.S. Application Data

[63] Continuation-in-part of Ser. No. 22,068, Mar. 19, 1979, abandoned.

[51] Int. Cl.³ .................... B64C 29/00; B64C 39/06
[52] U.S. Cl. ............................... 244/12.2; 244/52
[58] Field of Search .................. 244/12.1, 12.2, 12.4, 244/23 R, 23 C, 23 A, 17.11, 17.19, 29, 52; 416/20 R, 21, 22; 60/39.34

[56] References Cited

U.S. PATENT DOCUMENTS

| | | | |
|---|---|---|---|
| 2,939,654 | 6/1960 | Coanda | 244/23 C |
| 2,974,902 | 3/1961 | Schofer | 64/39.34 |
| 3,199,809 | 8/1965 | Modesti | 244/23 C |
| 3,640,489 | 2/1972 | Jaeger | 244/23 C |
| 3,946,970 | 3/1976 | Blankenship | 244/23 C |
| 4,023,751 | 5/1977 | Richard | 244/23 C |

FOREIGN PATENT DOCUMENTS

| | | | |
|---|---|---|---|
| 492365 | 12/1975 | Australia | 244/23 C |
| 2451061 | 4/1976 | Fed. Rep. of Germany | 244/23 C |
| 1085378 | 2/1955 | France | 244/23 C |
| 1129038 | 3/1958 | France | 244/23 C |

*Primary Examiner*—Galen L. Barefoot
*Attorney, Agent, or Firm*—Basile, Weintraub & Hanlon

[57] ABSTRACT

An aerodynamic device which can take off and land vertically is disclosed. The device comprises a non-rotating central body surrounded by an outer rotating disc concentric with the central body. A plurality of jets affixed to the disc are selectively vectorable between a vertical, tangential, or radial direction. One or more reaction jets are affixed to the central body and vectored to counteract a torque generated by the rotating disc. The jets affixed to the central body so that as the disc rotates relative to the body the jets are rotated in a counter direction to have a common longitudinal axis with the central body. Pairs of radial vanes disposed along the upper and lower walls of the disc are hinged to their respective walls, and when open impart a lifting action to the disc. The pairs of upper and lower vanes are interconnected by a slot which makes the lifting action of the vanes aerodynamically more effective. The slots also serve as a means for causing the disc to rotate relative to the central body in the event of a total power failure and give the device a degree of stability and control during a non-powered decent.

7 Claims, 8 Drawing Figures

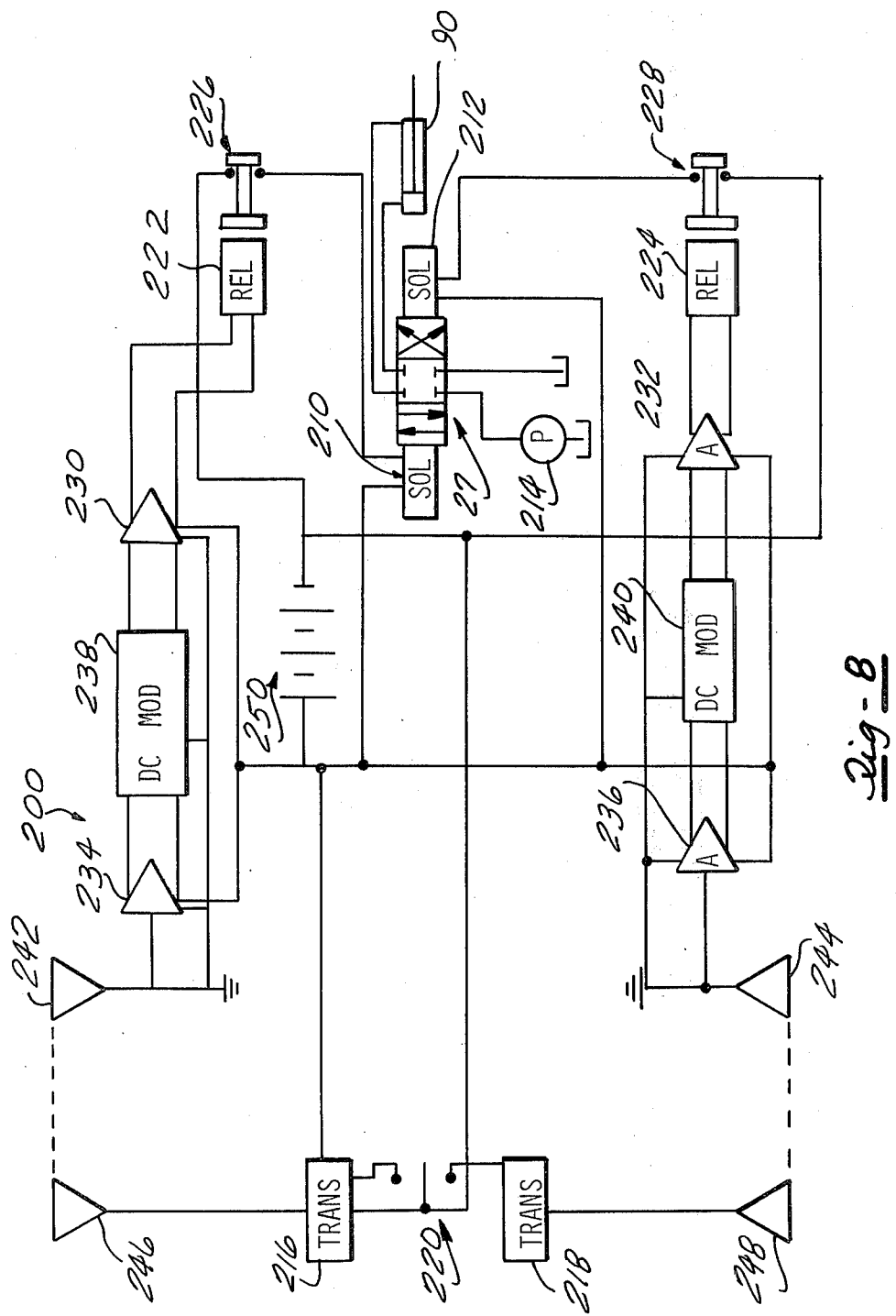
Fig-B

AERODYNAMIC DEVICE

CROSS REFERENCE TO RELATED APPLICATIONS

This application is a continuation-in-part of application Ser. No. 022,068 filed Mar. 19, 1979 entitled "Aerodynamic Device", now abandoned.

BACKGROUND OF THE INVENTION

I. Field of the Invention

The present invention relates to the field of aerodynamic devices and in particular to the field of aerodynamic devices capable of vertical take off and landing. Even more particularly the present invention relates to the field of aerodynamic devices that are disc shaped and capable of vertical take off and landing having an outer disc which rotates relative to the central portion of the device and is powered by jets.

II. Prior Art Statement

Disc shaped aerodynamic devices have long been known. U.S. Pat. Nos. 2,949,693; 3,109,256; 3,204,891; 3,394,906; 3,477,168; 3,508,360; 3,568,358; and 4,065,873 are typical of prior art devices employing a rotatable disc for aerodynamic stability.

U.S. Pat. Nos. 2,949,693; 3,204,891; 3,394,906; 3,477,168; 3,568,358; and 4,065,873 all employ a power plant of the internal combustion engine type which drives a rotating propeller directing air downward, producing an upward reaction force to lift the device into the air. A torque reaction by the propeller causes the outer disc of the device to rotate in a direction counter to the propeller. Vanes or blades rotatable with the disc are employed to impart further lift to the device as the disc rotates.

U.S. Pat. Nos. 3,109,256 and 3,508,360 disclose an aerodynamic device which is jet powered as in the present invention. While these disclosures employ a rotating disc which is powered by a jet, they do not disclose a central body which does not rotate and is prevented from rotation by one or more reaction jets. None of the aforementioned disclosures include means for vectoring the jets which rotate with the disc to direct a thrust along a common vector.

The above listed U.S. patents constitute the entire art known to the applicant.

SUMMARY OF THE INVENTION

The present invention discloses an aerodynamic device comprising: a non-rotating central body including a vertical axis; an outer disc rotatably supported by the central body encircling the central body; a plurality of jets affixed to the disc along a bottom wall thereof, the jets selectively vectorable between a vertical, tangential, or radial direction; one or more reaction jets affixed to the central body are vectored to counteract a torque generated by the disc; and means is provided for vectoring the jets in a common direction.

A plurality of conduits interconnect a high pressure chamber of each jet and reaction jet to a plenum. The plenum, serves as a reservoir of fluid pressure for distributing the jet flow evenly throughout the various jets and reaction jets as needed for proper control of the device. A variable restriction within each conduit serves as a device for controlling the distribution of the compressed fluid. A ring gear driven by hydraulic motors causes the outer disc to rotate to create lift and stability.

One or more pairs of vanes comprising an upper vane and a lower vane are radially aligned and hinged to selectively open or cover a plurality of openings in the disc. The upper vanes are radially aligned and hinged to selectively open or cover an upper opening in the disc upper wall. The lower vanes are radially aligned and hinged to selectively open or cover a lower opening in the disc bottom wall. A pair of spaced apart vertical walls enclosed by a pair of end walls from a slot which interconnects the upper opening and the lower opening. The vanes are hinged along a radial edge to produce lift when the disc rotates. Cylinders are provided to selectively open and close the vanes. The vanes co-operating with the slots provide additional lift when the disc is rotating. In the event of a power failure the vanes and slots co-operate to provide a spinning motion to the disc as the device decends enabling the device to be controlled and produce a soft landing.

For a more complete understanding of the present invention, reference is made to the following detailed description and accompanying drawings.

Other advantages and applications of the present invention will become apparent to those skilled in the field to which this invention pertains, when the accompanying description of the best mode contemplated for practicing the invention is read in conjunction with the accompanying drawings.

BRIEF DESCRIPTION OF THE DRAWINGS

In the drawings like reference numbers refer to like parts throughout the several views and wherein:

FIG. 8 illustrates a circuit for the remote control of the various hydraulic cylinders for control of the device.

DESCRIPTION OF THE PREFERRED EMBODIMENT

Figure 1:
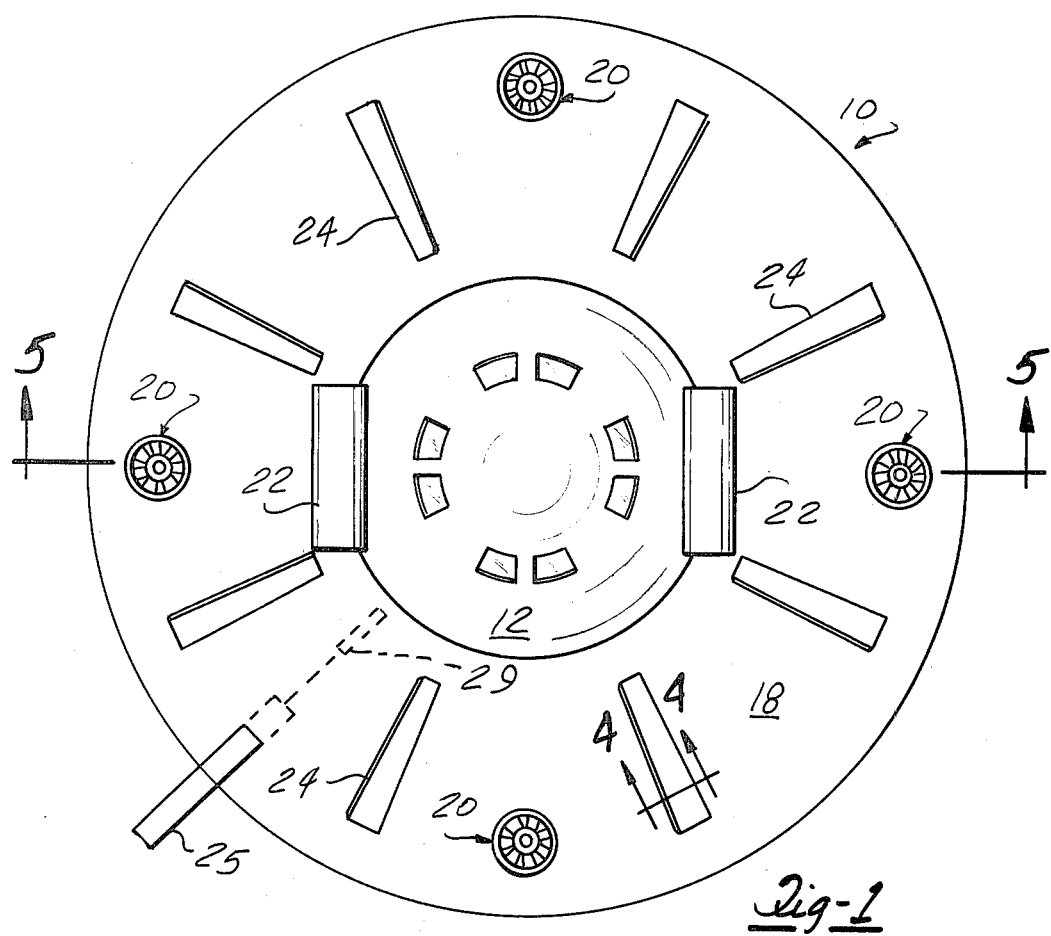
FIG. 1 illustrates a top view of a device embodying the teaching of the present invention.
Figure 2:
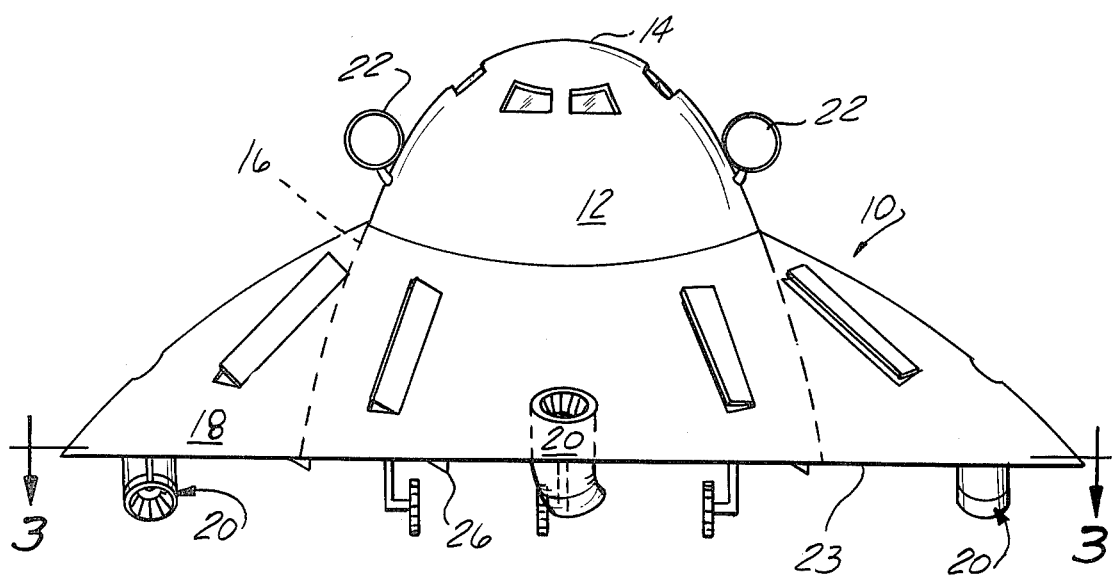
FIG. 2 illustrates a side view of the device of FIG. 1.

Referring now to the drawings and in particular to FIGS. 1 and 2 wherein there is illustrated at 10 a preferred embodiment of the present invention comprising an aerodynamic device comprising a central body 12 having a vertical axis. The central body 12 has a dome shaped top 14 which joins downward and outward sloping sides 16 in the form of a truncated cone. An outer disc 18 encircles the central body 12 and is concentric therewith. The outer disc is rotatably supported by the central body 12 and mechanically rotated in a manner which will be more fully described hereinbelow.

A plurality of jets 20 affixed to the disc along a bottom wall thereof are selectively vectorable between a vertical, tangential, or radial direction. The means for vectoring the jets will be described more fully hereinbelow.

One or more pairs of radially aligned and hinged vanes including an upper vane 24 and a lower vane 26 which are disposed along an upper surface and a lower surface 23 of the disc 18. The upper vane is radially aligned and hinged to selectively open or cover an upper opening 31 in the disc upper surface. The lower vane 26 is hinged to open and close a lower opening 33 in the lower surface. A pair of spaced apart vertical walls enclosed by a pair of end walls form a slot 28 interconnecting the upper opening and the lower opening. The vanes are hinged along a radial edge and produce lift when the disc is rotating. A cylinder means 27 is provided for selectively opening and closing the vanes. The open vanes and the slot co-operate to form a means for increasing the lift of the device when the outer disc is rotating. Should the power fail during flight of the device, opening the vanes 24 and 26 allows air to flow along the slots 28 causing the disc 18 to rotate and enhance the stability and lift of the device 10 which enables a soft landing. Rotation of the disc 18 provides stability in a manner similar to the way a rotating bicycle wheel stabilizes a bicycle.

A plurality of conduits 30 (FIG. 5) interconnect a high pressure chamber (not shown) of each jet and reaction jet 22 to a plenum 32. The plenum 32 comprises an inner wall around an inner periphery of the disc formed by the downward and outward sloping portion 16 of the outer wall of the central body, an outer wall 33 spaced from the inner wall, an upper dynamic seal 38 between an upper end of the outer wall and the inner wall, and a lower seal 40 between a lower end of the outer wall and inner wall. A variable restriction 42 provides a means for controlling the flow of gas from the high pressure side of the jets to the plenum. The plenum 32 and the conduits 30 serve as a means for providing thrust to any of the various jets that might fail.

Figure 6:
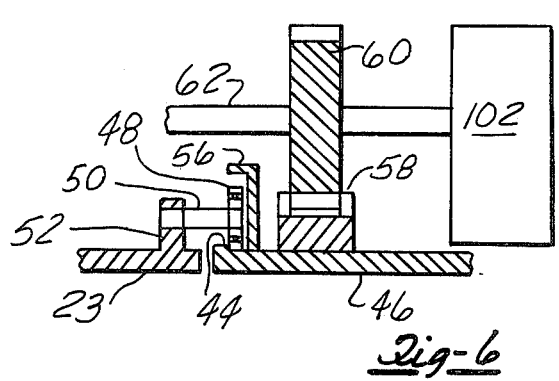
FIG. 6 illustrates a cross-sectional view taken along the lines 6—6 of FIG. 3.

As shown in FIG. 6 of the drawing, the outer disc 18 is rotatably supported by the central body 12 by a "U" shaped ring 44 which defines the periphery of the bottom wall 46 of the central body 12. A plurality of antifriction bearings 48 engage the "U" shaped ring 44 and a plurality of shafts 50 engage a bore of the plurality of bearings 48. The shafts 50 extend radially outward and are supported by a plurality of support members 52 which are attached to a bottom wall of the disc 23. An inner leg of the "U" shaped ring projects upward a distance and then radially outward to form an upper wall 56 which overlays the upper portion of the outside diameter of the bearing 48 restricting the vertical movement of the bearing 48.

Figure 3:
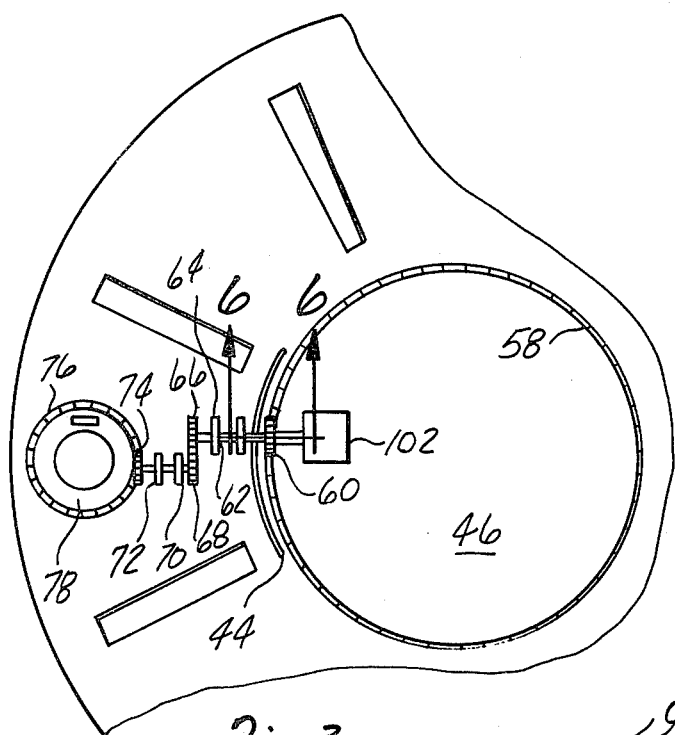
FIG. 3 illustrates a vertical sectional view of the device of FIG. 1 taken along the lines 3—3 of FIG. 2.
Figure 4:
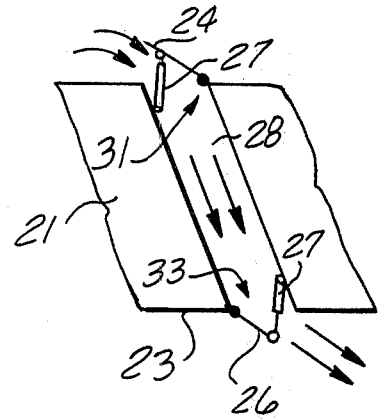
FIG. 4 illustrates a cross-sectional view of the slots in the disc taken along the lines 4—4 of FIG. 1.
Figure 7:
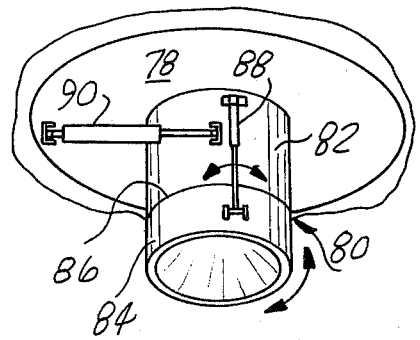
FIG. 7 illustrates a partial perspective view of the vectoring device of the jets.

The rotation of the outer disc is achieved through a hydraulic motor 102 and gear assembly. The motor is connected to a pump 103 which drives the motor, the motor in turn, causes rotation of the disc through a gearing arrangement described as follows:

A first ring gear 58 is disposed around the periphery of the central body bottom wall 46 spaced in a distance from the outer edge thereof (FIGS. 6 and 7). An input gear 60 is meshed with the ring gear 58, and the first gear is supported at the inner end of a shaft 62 which is fixedly attached to the gear 60 for rotation therewith (FIG. 3). The shaft 62 is rotatably driven by an hydraulic motor 102 which is powered by a first engine driven hydraulic pump 103 which is mechanically driven by a gear box of reaction jets 22. Jets 22 produce a controllable thrust in opposed tangential directions to counter the rotation of the outer disc 18 and keep the central body 12 pointed in the desired direction. The shaft 62 extends radially outward and is rotatingly supported by a pair of spaced apart pillow blocks 64 affixed to the disc bottom wall 21. An outer end of the shaft 62 is affixed to a second gear 66 which rotates with the input gear 60. A third gear 68 is meshed with the second gear 66 which is fixedly attached to a shaft 70 for rotation therewith. The shaft 70 extends radially outward and is rotatingly supported by a second pair of pillow blocks 72 which are affixed to the bottom wall of the disc 21. The outer end of the shaft 70 has affixed thereto a fourth gear 74 which rotates with the third gear 68 and the shaft 70. The fourth gear 74 meshed with the drives a second ring gear 76 which is affixed to the periphery of a jet support platform 78 for rotation therewith. The ratio of the gears is configured to create for each revolution of the disc 16 relative to the central body 12, a counter revolution of the jet platform 78 relative to the central body 12 as the disc rotates orienting a vector of the jet engine attached to the platform 78. Thus all jets affixed to the disc are vectored in a common direction relative to the central body 12 as the disc rotates. The jets 22, in addition to providing hydraulic power through the gear box (not shown) also provide electrical power for the central body 12 and a jet reaction force to control the direction of the central body.

While a plurality of jets 20 are used in the present invention and distributed around the perimeter of the disc 18, the control and vectoring of only one jet will be described herein for the sake of brevity and clarity. Each jet 20 has affixed thereto a rotatable swiveling nozzle 80 (FIG. 7) comprising a vertical conduit 82 affixed to the jet support platform 78, and a swiveling nozzle 84 joined to the conduit by a sphere and sperical socket joint 86 which allows the swiveling nozzle 84 to direct the output of the jet at a variable angle with respect to the vertical conduit 82. A cylinder means 88 is swively attached at the cylinder end to the jet platform 78 and at the rod swively attached to the swiveling nozzle 84. Extension of the rod of the cylinder 88 directs the jet toward a vertical vector and the retraction of the rod of the cylinder 88 directs the jet toward a horizontal vector. The vertical conduit 82 is rotatable about an axis of the jet platform 78. A second cylinder means 90 has its cylinder end pivotally attached to an outer surface of the conduit 82. Extension of the rod of the cylinder 90 rotates the conduit 82 in a first direction and retraction of the rod of the cylinder 90 rotates the conduit 82 in a second direction. As is understood by the skilled artisan, manipulation of the cylinder means 88 and 90 selectively directs the vector of the jet in a desired direction.

A second hydraulic pump is driven by the jet 20 by either electrical mechanical, or air turbine means and the hydraulic power generated is used to operate the cylinders 88 and 90, as well as the cylinder means of the vanes 24, 26. Hydraulic directional valves 27 are remotely operated to control the cylinders 88 and 90 in response to a command signal generated by the operator of the device. The command signal is transmitted to the hydraulic valves by the circuit 200 as shown in FIG. 8 of the drawing.

In the circuit 200 the hydraulic directional valve 27 is a double solenoid spring centered valve. When a first solenoid 210 is energized the cylinder 90 is caused to retract its rod. When the solenoid 212 is energized the cylinder 90 is caused to extend its rod. Hydraulic power for operating the hydraulic cylinder 90 provided by a pump 214 which may be either electrically or mechanically driven. Circuit 200 includes a pair of transmitters 216, 218 tuned to their individual frequencys to operate a receiver without interference from one another. A switch 220 is employed to selectively activate either the transmitter 216 or the transmitter 218. Normally open relays 222, 224 are employed to selectively energize either solenoid 210 or 212 respectively by means of normally open relay contacts 226, 228. The coil of the relay 222, 224 is selectively energized by the output of audio amplifiers 230, 232 which is turn are connected to a tuned radio frequency amplifier 234, 236 and a demodulator 238, 240. A pair of antennas 242, 244 are connected to tuned radio frequency amplifiers 234, 236, and receive a radio frequency signal from the transmitters 216, 218 by means of transmitter antennas 246, 248.

In operation the operator moves switch 220 to activate one of the transmitters 216, 220. For reasons of simplicity let us assume the operator has moved the switch 220 to activate transmitter 216. A modulated radio frequency signal will be transmitted by antenna 246 which will be picked up by the receiving antenna 242 and amplified by the tuned radio frequency amplifier 234. The output of the amplifier 234 is demodulated by the modulator 238 and the signal is amplified by the audio amplifier 230 and is transmitted to the relay 222 which closes contacts 226 and activates solenoid 210 porting oil to the rod end of cylinder 90 forcing the rod of the cylinder 90 to retract. Moving the switch 220 to a position activating transmitter 218 causes relay 224 to close contacts 228 energizing solenoid 212 which ports hydraulic oil to the piston end of the cylinder 90 causing the rod of the cylinder to extend. A battery 250 provides the electrical energy for operating the circuit 200. The battery is kept charged by a generator driven by the jet 20.

Figure 5:
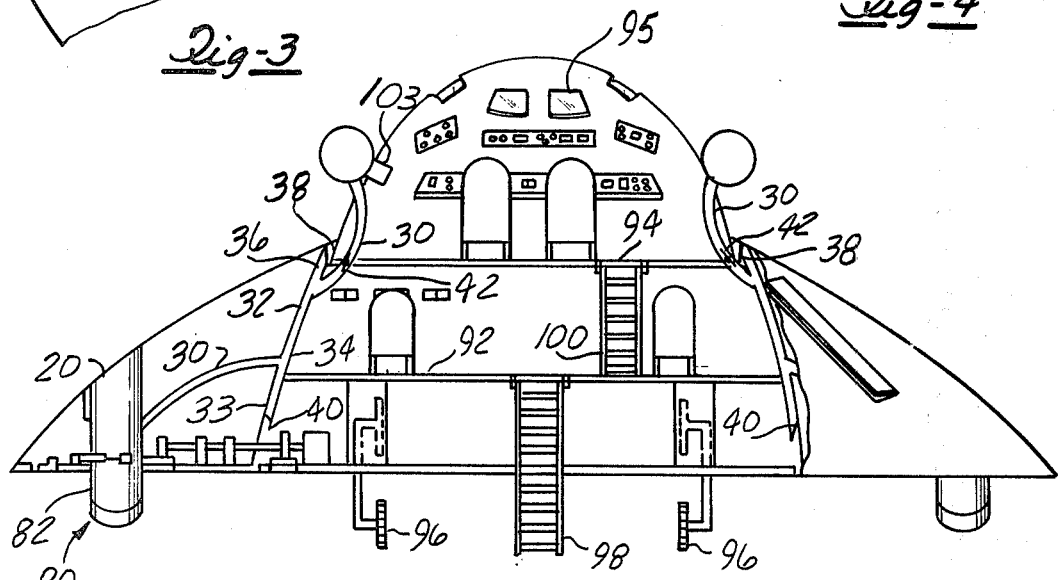
FIG. 5 illustrates a cross-sectional view of the device of FIG. 1 taken along the lines 5—5 of FIG. 1.

A horizontal deck 92 is spaced from and parallel to the bottom wall 46 of the central body 12 (FIG. 5). The deck 92 extends to the walls of the central body 12 providing structural support. The space between the deck 92 and the bottom wall 46 accommodates fuel tanks, controls, and the mechanism and wheel wells for a retractable landing gear 96. A command deck 94 is spaced above the engineering deck 92 extending between the outer walls of the central body 12 providing a compartment for the operator of the vehicle. A plurality of windows 95 provide a view of the surrounding area. The reaction jets 22 operate hydraulic pumps and generators for generating the necessary electrical and hydraulic power for operating the controls, and for retracting or extending the landing gear, as well as power for operating the restriction 42. Access hatches are provided between decks and a retractable latter 98 provides a means for access from the ground to the engineering deck 92. A stationary ladder 100 provides access from the engineering deck 92 to the command deck 94.

In operation the reaction jets 22 are first started which provides electrical power and pressure to the plenum 32. Batteries are provided to supply the necessary cranking power to first start the engines 22. Pressure from the plenum 32 is directed by means of the conduits 30 to the plurality of jets 20. Pressure from the plenum 32 provides the cranking energy necessary to initiate the starting of the jets 20. When all jets are operating properly the operator increases jet thrust and directs hydraulic oil to the hydraulic motor 102 causing the disc 18 to rotate. The vanes 24 and 26 are then opened to provide additional lift and the device lifts from the ground. Once airborne the nozzles 84 are vectored to move the vehicle laterally and the lateral motion induces an aerodynamic lift due to the air passing over the top of the device reaching a higher velocity than the air passing there under which produces a lower pressure at the top of the device than at the bottom in a well known aerodynamic manner. When a desired altitude has been reached the vanes 24 and 26 are closed reducing the amount of drag generated by the vehicle outer surface, and high speed lateral motion can be achieved. The thrust and direction of the jets is controlled by the speed of the jet 20 and the direction of the nozzle 84 giving the operator complete control over the device.

In the event of an engine failure the vanes 24 and 26 are opened and a soft decent of the device under controlled conditions is possible due to the rotation of the disc 18 induced by the slots and the vanes. Electricity can be drawn from the batteries for control purposes in the event the jet powered generators fail. With the disc 18 rotating about the central body 12, the ring gear 58 drives the input gear 60 and shaft 62. A generator and hydraulic pump can alternately be driven by the shaft 62 to provide electrical and hydraulic power in the disc during flight.

To improve the air inlet efficiency of the jets 20, scoops (not shown) can be affixed to the upper end of the jets to use the rotary motion of the disc 18 to direct air into the jets. Alternately, the jets 20 can be disposed along a horizontal axis with the swiveling nozzles 84 selectively directed downward for vertical lift.

During lift off and vertical decent a plurality of retractable helicopter type blades 25 (FIG. 1) can be employed along the perimeter of the disc 18. An extending cylinder 29 is employed to extend or retract the blades which are slidingly supported by the disc 18.

A horizontal projected area of the outer wall 33 is created by its downward and outward projections. The pressure in the plenum 32 on the horizontal area causes an upward force on the disc 18 resulting in a lifting action. The lifting action reduces the downward load that the weight of disc imposes on the bearings 48 (FIG. 6).

While a manned aerodynamic device is described herein employing turbojet engines, it is obvious to the skilled artisan that a toy device can be devised from the above described device by using a charged cartridge of $CO_2$ or similar gas to provide the energy for the jets. Fixedly orienting the jets along a predetermined vector can be selectively cause lateral or vertical flight or a flight path in between vertical or lateral.

Having thus described my invention what I claim is:
1. An aerodynamic device comprising:
   a central body including a vertical axis, an outer wall and a bottom wall;
   an outer rotatable disc concentric with the central body axis, including an upper wall, and a bottom wall;
   a plurality of jets affixed to the disc bottom wall selectively vectorable between a vertical, tangential or radial direction;
   one or more reaction jets affixed to the central body vectored to counteract a torque generated by the disc;
   means for vectoring the jets in a common direction;

means for rotatably supporting the disc with the central body; and means for rotating the outer rotatable disc.

2. The aerodynamic device as defined in claim 1 wherein the means for vectoring the jets comprises:
 a first ring gear proximate the periphery of the central body;
 an input gear rotationally affixed to the disc bottom wall meshing with the ring gear
 a second gear spaced from the first gear joined thereto by a first common shaft for rotation therewith;
 a third gear meshed with the second gear;
 a fourth gear spaced from the third gear and joined thereto by a second common shaft for rotation therewith;
 a plurality of pillow blocks affixed to the disc bottom wall to support the gears;
 a jet support platform proximate the periphery of the disc rotatable about an axis spaced from and rotatable about the vertical axis, and supported by the disc bottom wall;
 a second ring gear proximate the periphery of the jet support platform meshed with the fourth gear, the ratio of the gears configured to create for each revolution of the disc relative to the central body a counter revolution of the jet support platform; and
 a rotatable swiveling nozzle comprising, a vertical conduit affixed to the jet support platform, a swiveling nozzle joined to the conduit by a sphere and sperical socket joint, a first cylinder means to direct a jet between a vertical and a horizontal vector relative to the jet support platform, and a second cylinder means for rotating the vertical conduit relative to the jet support platform.

3. The aerodynamic device as defined in claim 1 wherein the means for rotatably supporting the disc to the central body comprises:
 a "U" shaped ring around the periphery of the central body;
 a plurality of anti-friction bearings nestingly engaging the ring, the bearings including a radial axis intersecting the vertical axis;
 an upper wall spaced from and overlaying the bearing outer diameter; and
 a plurality of shafts engaging the bearing bores, the shafts fixedly supported by a support attached to the disc bottom wall.

4. The aerodynamic device as defined in claim 1 further comprising:
 a plurality of conduits interconnect a high pressure chamber of each jet and reaction jet to a plenum;
 the plenum comprises, an inner wall around an inner periphery of the disc formed by a downward and outward sloping portion of the outer wall of the central body, an outer wall spaced from the inner wall, an upper dynamic seal means between an upper end of the outer wall and the inner wall, and a lower dynamic seal means between a lower end of the outer wall and the inner wall; and
 a variable restriction in each conduit.

5. The aerodynamic device as defined in claim 1 further comprising:
 one or more pairs of vanes including an upper vane and a lower vane;
 the upper vane radially aligned and hinged to selectively open or cover an upper opening in the disc upper wall;
 the lower vane radially aligned and hinged to selectively open or cover a lower opening in the disc bottom wall;
 a pair of spaced apart vertical walls enclosed by a pair of end walls forming a slot interconnecting the upper opening and the lower opening;
 the vanes hinged along a radial edge to produce lift when the disc rotates; and
 means for selectively opening and closing the vanes.

6. The aerodynamic device as defined in claim 1 wherein the plurality of jets and the reaction jets are axial flow turbojet engines.

7. An aerodynamic device comprising:
 (a) a central body including a vertical axis, an outer wall and a bottom wall;
 (b) an outer rotatable disc concentric with the central body axis, including an upper wall and a bottom wall;
 (c) a plurality of jets affixed to the disc bottom wall selectively vectorable between a vertical, tangential or radial direction;
 (d) means for counteracting the torque generated by the disc;
 (e) means for vectoring the jets in a common direction;
 (f) means for rotatably supporting the disc with the central body;
 (g) means for rotating the outer rotatable disc.

* * * * *